United States Patent
Lisi et al.

(10) Patent No.: US 9,733,994 B2
(45) Date of Patent: Aug. 15, 2017

(54) METHOD AND SYSTEM FOR COMMUNICATING INFORMATION BETWEEN A MOBILE DEVICE AND AN ENTERPRISE SYSTEM

(71) Applicant: Accenture Global Services Limited, Dublin (IE)

(72) Inventors: Rocco Lisi, Barcelona (ES); Benjamin Rodriguez, Barcelona (ES); Sergi Lalaguna, Barcelona (ES); Jordi Perez Riera, Barcelona (ES); Jose Ramon Sanfiz, Barcelona (ES)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/982,702

(22) Filed: Dec. 29, 2015

(65) Prior Publication Data

US 2016/0188386 A1 Jun. 30, 2016

(30) Foreign Application Priority Data

Dec. 30, 2014 (EP) .................................. 14380041

(51) Int. Cl.
G06F 9/54 (2006.01)
H04L 29/08 (2006.01)

(52) U.S. Cl.
CPC .............. *G06F 9/541* (2013.01); *H04L 67/02* (2013.01); *H04L 67/2823* (2013.01)

(58) Field of Classification Search
None
See application file for complete search history.

(56) References Cited

U.S. PATENT DOCUMENTS

| 7,836,456 B1 | 11/2010 | Violleau et al. |
| 2007/0094372 A1 | 4/2007 | Hariharan et al. |
| 2010/0306747 A1 | 12/2010 | Pawlowsky |

(Continued)

FOREIGN PATENT DOCUMENTS

EP     1701513 A1    9/2006

OTHER PUBLICATIONS

Extended European Search Report for European Application No. 14 380 041.5, Completed May 7, 2015.

*Primary Examiner* — Syed Roni
(74) *Attorney, Agent, or Firm* — Brinks Gilson & Lione

(57) ABSTRACT

A method for communicating information between a mobile device and a computer system includes receiving a request from the mobile device to invoke a process of a legacy API of the computer system. The request specifies one or more input values associated with required input parameters of the process. The input values are provided in a first format that is different from a second format utilized by the legacy API for communicating data. The computer system determines required input parameters of the process, generates an input data structure in the second format that includes an entry for each of the required input parameters, determines parameters that are associated with the one or more input values communicated in the request, and sets values of entries in the input data structure associated with the one or more determined parameters to corresponding one or more input values in the request. A message call to the legacy API that includes the input data structure formatted in the second format is generated.

20 Claims, 14 Drawing Sheets

(56) References Cited

U.S. PATENT DOCUMENTS

| | | | |
|---|---|---|---|
| 2010/0333115 A1 | 12/2010 | Yospe et al. | |
| 2012/0310899 A1* | 12/2012 | Wasserman | G06F 17/3056 707/687 |
| 2013/0054514 A1* | 2/2013 | Barrett-Kahn | G06F 17/30902 707/608 |
| 2013/0191509 A1* | 7/2013 | Loughry | G06F 9/541 709/219 |
| 2015/0229638 A1* | 8/2015 | Loo | G06Q 10/10 726/9 |

* cited by examiner

```
<m:GetInfo xmlns:m="http://www.enterprise.com/data">
    <m:Name>  xxx   </m:Name>
    <m:SSN>   xxx   </m:SSN>
    <m:DOB>   xxx   </m:DOB>
</m:GetPrice>
```

Fig. 6B

```
<m:GetInfo xmlns:m="http://www.enterprise.com/data">
    <m:Name>  John Doe  </m:Name>
    <m:SSN>   NA   </m:SSN>
    <m:DOB>   NA   </m:DOB>
</m:GetPrice>
```

Fig. 6C

```
<m:GetInfoResponse xmlns:m="http://www.enterprise.com/data">
  <m:Name> John Doe  </m:Name>
  <m:SSN>   555-22-1111   </m:SSN>
  <m:DOB>   02-03-1990    </m:DOB>
  <m:Address> 555 Main St., New York, NY </m:Address>
</m:GetInfoResponse>
```

```
[{"Address":"555 Main St., New York, NY"}]
```

METHOD AND SYSTEM FOR COMMUNICATING INFORMATION BETWEEN A MOBILE DEVICE AND AN ENTERPRISE SYSTEM

RELATED APPLICATIONS

This application claims priority to European Application No. 14 380 041.5, filed Dec. 30, 2014, the content of which is hereby incorporated by reference in its entirety.

BACKGROUND

Field

This application relates to network communications. In particular, this application is related to a method and system for communicating information between a mobile device and an enterprise system.

Description of Related Art

There are many instances where it is desirable to ingest information presented on a web page into an application for further processing. In the past, application developers resorted to downloading the web page and scraping the web page to find the desired information. Scraping typically involves searching for certain keywords on the web page that identify information on the web page. The obvious problem with this approach is that the scraping algorithm requires a degree of consistency in the layout of the web page. When the layout changes, the scraping algorithm may need to be changed accordingly.

To overcome this issue, some web servers provide a web service application program interface (API) that streamlines access to the information stored or accessible via the web server. Generally, a web service API exposes certain processes for communicating information to and from the web server. Processes of the API are called by sending an extensible markup language (XML) message to the web server that includes an exposed GET process for getting a particular type of information and possibly input values required by the GET process. The web server responds with an XML formatted RESPONSE message that includes the requested values.

XML documents are text files that define a tree structure of various elements. The elements are identified by tags and may be nested. That is, elements can have child elements. The XML messages utilized by the web service API typically conform to a simple object access protocol (SOAP) that defines the general structure of XML GET and RESPONSE messages utilized by the web service API.

A typical SOAP message includes an envelope element that identifies the XML document as a SOAP message, a header element that contains header information, a body element that contains call and response information, and a fault element that includes errors and status information. The body element is utilized to specify either the GET process and its associated input values, or the RESPONSE and its associated response values.

While the procedure described above for accessing information provides for a universal method for accessing information, it does have its shortcomings. One of those shortcomings is that the messages tend to be relatively large in relation to the amount of data being requested. For example, calling a GET process for accessing the address of an individual requires not only a body element that specifies, for example, a GET_ADDRESS process and input value that specifies the name of the individual, but also the other elements required by the SOAP protocol (i.e., the envelope, header, etc.). Similarly, the RESPONSE message will include not only the desired address, but also an envelope, header, etc. This problem is exacerbated when the amount of information requested comes in the form of an array of values, because each value in the array is expressed within its own element in the XML message. That is, each value includes opening and closing tags for identifying the element.

Another problem resides in the fact that an application processing an XML RESPONSE message has to parse the XML file to extract the requested information. Parsing of XML messages tends to be a cumbersome and slow process, which increases processing time.

These shortcomings can present challenges when trying to access web server information from a mobile device. For example, the increased processing time required for parsing the XML messages increases the amount of time it takes for a given application to respond to a request for information. This in turn decreases the battery life of the mobile device, because the processor has to be in an active mode for a longer period. Similarly, the relatively large XML messages for getting and receiving information take a relatively long time to transmit and receive. Thus, the RF section of the mobile device will have to remain active for a longer period, which reduces the battery life further.

BRIEF SUMMARY

Methods, systems, and computer-readable media are provided that facilitate communicating information between a mobile device and an enterprise system.

In one aspect, a method for communicating information between a mobile device and a computer system includes receiving a request from the mobile device to invoke a process of a legacy API of the computer system. The request specifies one or more input values associated with required input parameters of the process. The input values are provided in a first format that is different from a second format utilized by the legacy API for communicating data. The computer system determines required input parameters of the process, generates an input data structure in the second format that includes an entry for each of the required input parameters, determines parameters that are associated with the one or more input values communicated in the request, and sets values of entries in the input data structure associated with the one or more determined parameters to corresponding input values in the request. A message call to the legacy API that includes the input data structure formatted in the second format is generated.

In a second aspect, a non-transitory computer-readable medium is provided that includes instruction code for facilitating the communication of information between a mobile device and a computer system that provides a legacy application program interface (API) to facilitate access to services of the computer system. The instruction code is executable by the computer system for causing the computer system to receive a request from the mobile device to invoke a process of the legacy API. The request specifies one or more input values associated with at least some required input parameters of the process. The input values are provided in a first format that is different from a second format utilized by the legacy API for communicating data. The computer system also determines required input parameters of the process of the legacy API, generates an input data structure in the second format that includes an entry for each of the required input parameters, determines one or more parameters of the required input parameters that are associated with the one or more input values communicated in the request, and sets values of entries in the input data structure associated with the parameters to corresponding input values in the request. The computer system then generates a message to call the process of the legacy API. The message is formatted in the second format and includes the input data structure.

In a third aspect, a system is provided that facilitates communications with a mobile device. The system provides a legacy application program interface (API) to facilitate access to services of the system. The system includes a processor and a computer-readable medium in communication with the processor. The computer-readable medium includes instruction code for facilitating the communication of information between the mobile device and the computer system, and the instruction code is executable by the processor to cause the processor to receive a request from the mobile device to invoke a process of the legacy API. The request specifies one or more input values associated with at least some required input parameters of the process. The input values are provided in a first format that is different from a second format utilized by the legacy API for communicating data. The processor also determines required input parameters of the process of the legacy API, generates an input data structure in the second format that includes an entry for each of the required input parameters, determines one or more parameters of the required input parameters that are associated with the input values communicated in the request, and sets values of entries in the input data structure associated with the parameters to corresponding input values in the request. The processor then generates a message to call the process of the legacy API. The message is formatted in the second format and includes the input data structure.

In a fourth aspect, a mobile device is provided for communicating information to a computer system. The mobile device includes a processor and a computer-readable medium in communication with the processor. The computer-readable medium includes instruction code for facilitating the communication of information between the mobile device and a computer system that provides a legacy application program interface (API) to access services of the computer system. The instruction code is executable by the processor to cause the processor to receive, from an application of the mobile device, a request to invoke a process of the legacy API. The request specifies one or more input values associated with at least some required input parameters of the process. The input values are provided in a first format that is different from a second format utilized by the legacy API for communicating data. The process provided by the legacy API is configured to return a response data structure. The processor determines whether response data associated with the response data structure is stored on the mobile device. If the response data is stored on the mobile device, the processor returns the stored response data to the application. When the response data is not stored on the mobile device, the processor communicates the request to a system, such as the system described above in the third aspect.

BRIEF DESCRIPTION OF THE DRAWINGS

FIGS. 6A, 6B, 7, and 8 illustrate exemplary operations performed by a middleware component of the system in obtaining JSON data, converting the JSON data to a SOAP message, and communicating the SOAP message to a web service API of the system;

FIGS. 6B and 6C illustrate exemplary XML formatted information that forms part of the SOAP message;

FIGS. 9B and 9C illustrate exemplary XML formatted information that forms part of a SOAP message response;

DETAILED DESCRIPTION

The embodiments described below overcome the problems described above with respect to accessing web service information by providing a system that serves information via a web services interface. The system also includes a middleware component 120 for streamlining information flow to and from a mobile device. The middleware component 120 operates in conjunction with an API of a mobile device to restructure information communicated to and from the mobile device into a more efficient format. The size of the information flowing between the mobile device and system is reduced as a result. Moreover, the information is provided in a format that is easily parsable by the mobile device. This in turn decreases the amount of processing power required in the mobile device to process the information, which increases the battery life of the mobile device.

Figure 1:
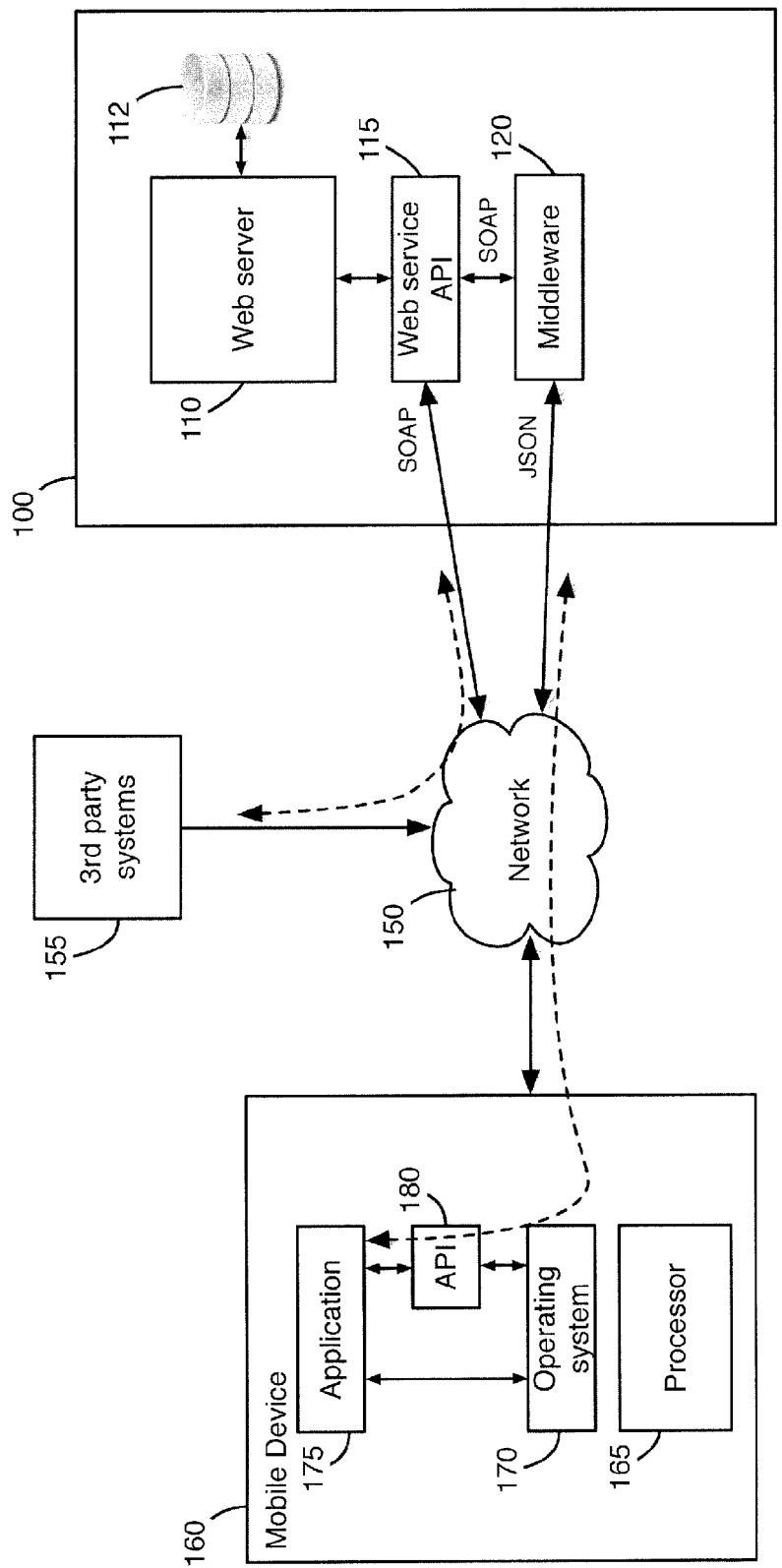
FIG. 1 illustrates an exemplary environment in which a mobile device and third-party systems communicate with a system.

FIG. 1 illustrates an exemplary environment that includes a system 100 that communicates with a mobile device 160. The system 100 may correspond to and enterprise system or be part of an enterprise system operated by an organization that provides services of some sort. The system 100 includes a web server 110 that generates web pages that facilitate access to information stored on one or more storage devices 112 of the system, and the submission of information to the storage devices 112. In this regard, the web server 110 may correspond to a computer system with server capabilities that includes one or more network interfaces that facilitate communications via a network 150. The computer system may correspond to one or more interlinked Intel®, AMD®, or PowerPC® based computers or different computers. The computers may execute one or more operating systems, such as Microsoft Windows®, Linux, Unix® or other operating systems. While the web server 110 is illustrated as a single entity, it is understood that the web server 110 may comprise various modules or subsystems that are interconnected with one another via various forms of communication links.

The web server 110 may include a storage medium for storing instruction code. The instruction code may be executable by the web server 110 to thereby implement a legacy API such as a web service API 115. The instruction code may be further executable to implement a middleware component 120. The web service API 115 generally operates as previously described. That is, the web service API 115 facilitates access by third-party systems 155 to information stored or accessible by the web service via SOAP formatted XML messages.

The middleware component 120 is configured to translate messages communicated from mobile device 160 or other devices into a format suitable for the web service API 115. Operations of the middleware component 120 are described in more detail below.

The mobile device 160 may correspond to a mobile phone, tablet, etc. The mobile device 160 may include a processor 165 such as an Intel®, AMD®, or PowerPC® processor or a different processor that implements and IOS®, Android®, or Windows® operating system 170, or a different operating system. The processor 165 may execute instruction code for implementing an application 175 through which a user requests and/or submits information to/from the system 100. The application 175 requests and submissions of information are communicated via an API 180 of the mobile device 160 that is configured to work in conjunction with the middleware component 120 of the system 100.

Operations of the API 180 of the mobile device 160 and the middleware component 120 are described below with reference to FIGS. 2-11. The illustrated operations may be performed by a combination of the processor 165 of the mobile device and a processor of the system 100. In this regard, instruction code for causing the respective processors to carry out the respective operations may be stored in or more storage devices in communication with the respective processors.

Figure 2:
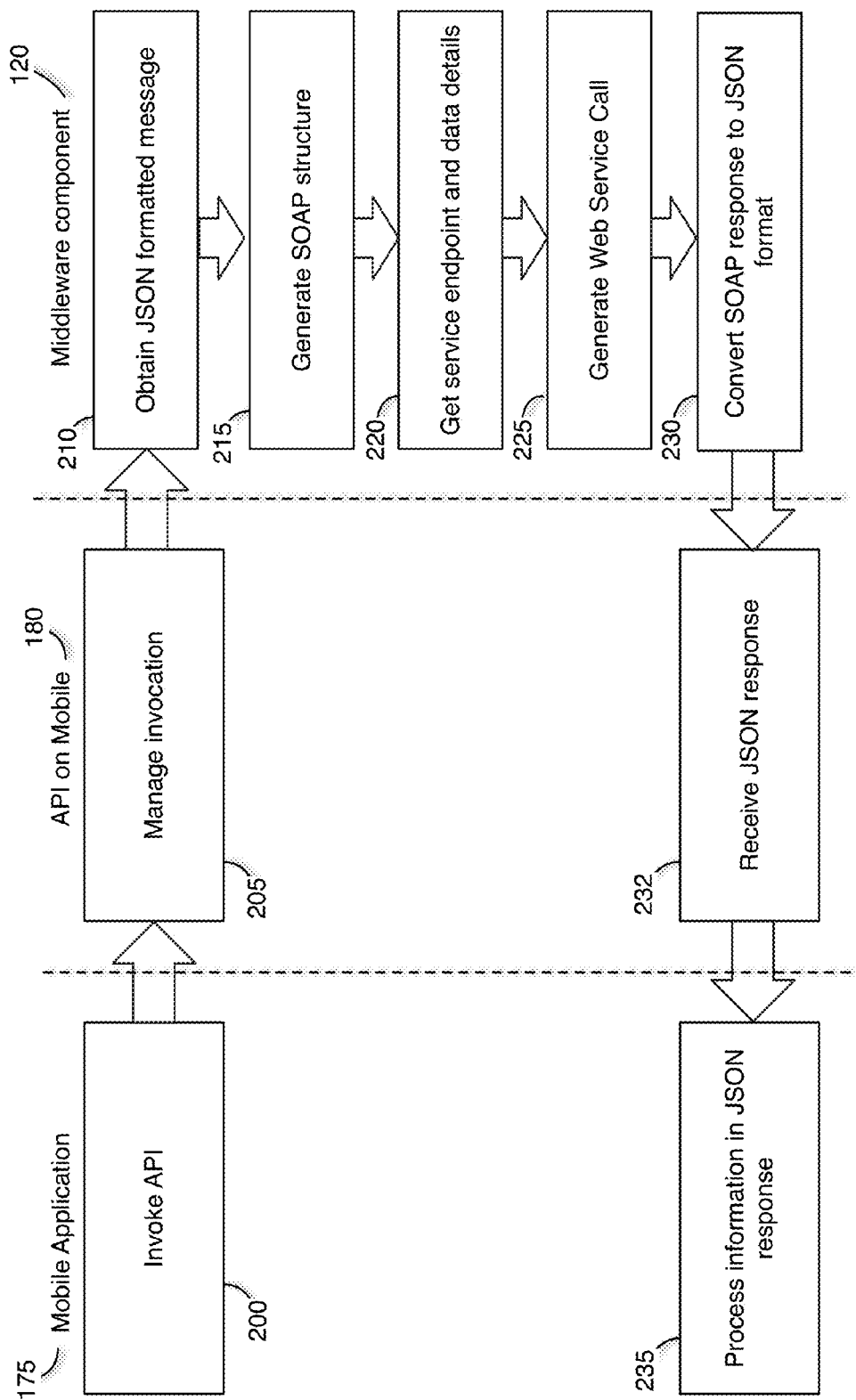
FIG. 2 provides an overview of the operations performed by the mobile device and the system and how the various operations are partitioned between the two.

FIG. 2 provides an overview of the operations performed by the mobile device 160 and the system 100 and how the various operations are partitioned between the two. For example, the operations of blocks 200 and 235 may be performed by the mobile device application 175. The operations of blocks 205 and 230 may be performed by the API 180 that operates on the mobile device 160. The operations of blocks 210 through 230 may be performed by the middleware component 120 of the system 100. Specific aspects of each operation are shown in the subsequent figures.

Figure 3:
FIG. 3 illustrates an exemplary process of an API of the mobile device, which is invoked to request information from the system.

At block 200, the mobile application 175 may invoke the API 180 to communicate a request for information to the system 100. For example, as illustrated in FIG. 3, the application 175 may invoke an API process 305 for retrieving information from the system 100. The API process 305 may require the specification of one or more input parameters 312 and one or more expected return parameters 314. The input parameters and return parameters may be specified using javascript object notation (JSON), which is a text based data-interchange format in which data is represented as key-value pairs. In the illustrated example, the address for an individual named "John Doe" is requested.

Figure 4:
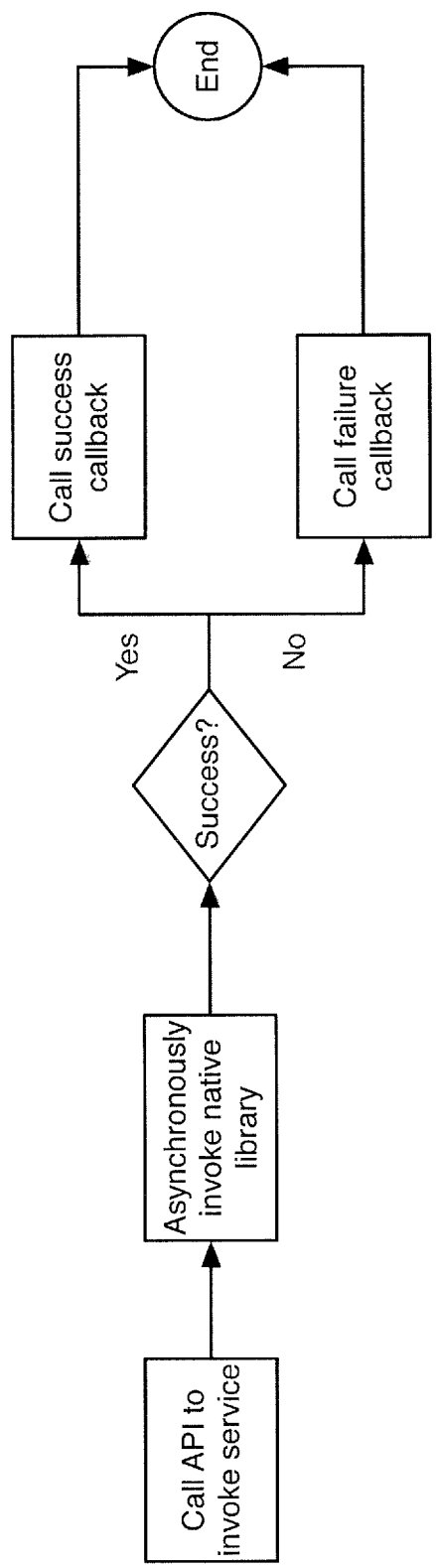
FIG. 4 illustrates exemplary operations performed by a mobile application when invoking the API.

As illustrated in FIG. 4, the API 180 may invoke a native library of the API 180 to perform other operations after the API process 305 is called by the application 175. In some implementations, these other operations may be invoked asynchronously to allow the application 175 to continue processing other aspects of the application, such as operations related to the graphical user interface (GUI) of the application 175. If the asynchronous invocation of the API process 305 is successful, the API 180 may call a previously registered success call-back process of the application 175 to report successful invocation. If there are invocation issues, the API 180 may call a previously registered failure call-back process of the application 175 to report the failure.

Figure 5:
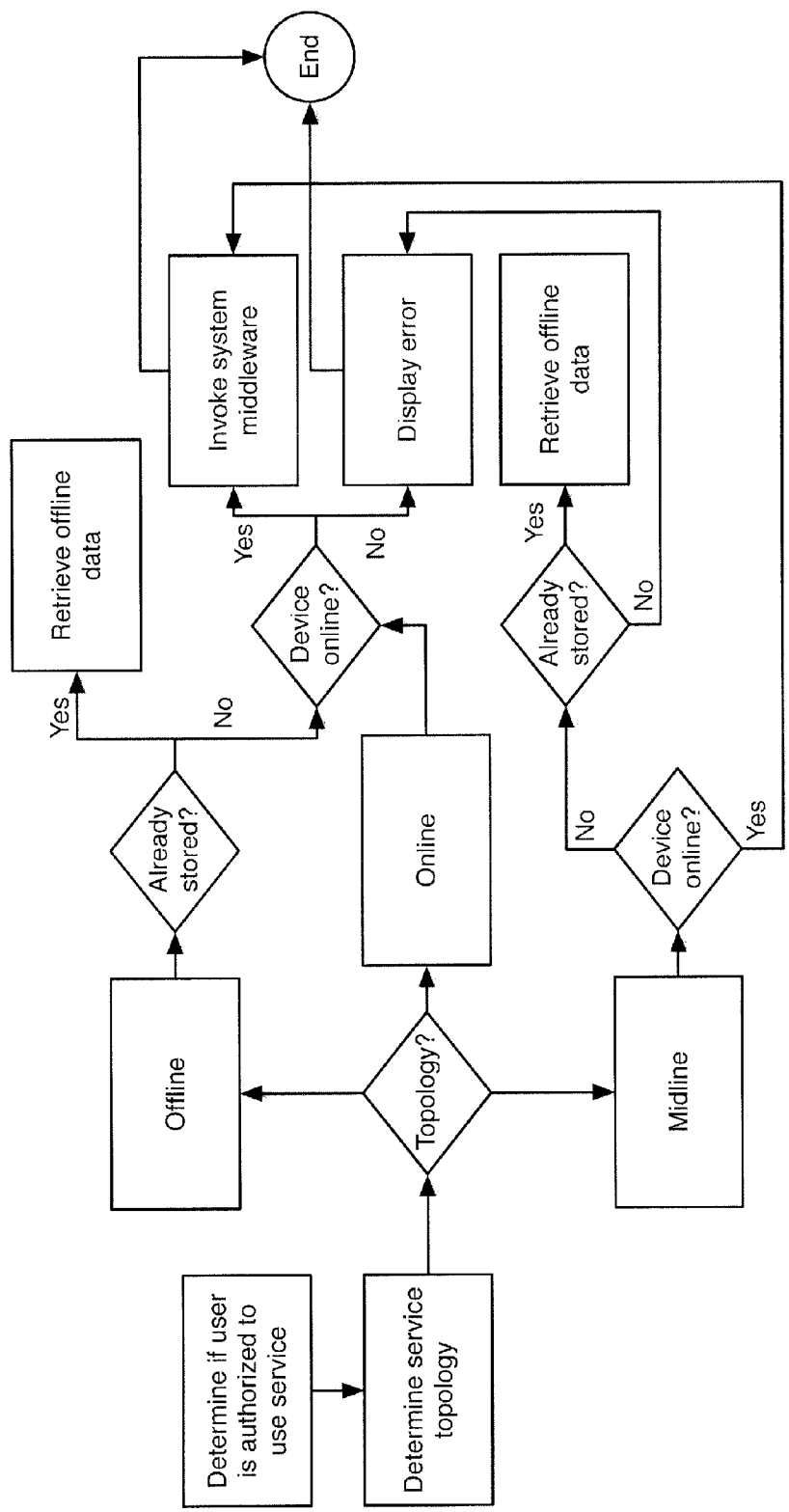
FIG. 5 illustrates exemplary operations performed by the API of the mobile device in managing the invocation.

At block 205 of FIG. 2, the API 180 manages the invocation of the requested API 180 process. As noted above, this operation may be performed asynchronously. Referring to FIG. 5, the API 180 may first determine whether a user of the mobile device 160 is authorized to access services exposed by the web service API 115 of the system 100. In this regard, the user may have previously registered with the system 100 and may have been provided with a username and/or password. The application 175 may have prompted the user for this information during a setup phase of the application 175 and communicated this information to the API 180.

The API 180 then determines whether the requested service conforms to one of an offline topology, a midline topology, or an online topology. The type of topology defines the manner in which the information requested by the API process 305 may be retrieved. An offline topology indicates that requested information may be retrieved from a local storage of the mobile device 160 when available. If the information is unavailable, the requested information may be retrieved from the network. For example, the API 180 may determine whether the requested information is stored within the mobile device 160. For example, the address requested above may have been previously requested and stored within the mobile device 160. In this type of topology, when the information is unavailable, the API 180 may invoke the middleware component 120 of the system 100 to retrieve the information.

A midline topology indicates that that requested information may be retrieved from the network when the mobile device 160 is online. When the mobile device 160 is not online, the information may be received from local storage. For a service that has a midline topology, the API 180 may first determine whether the mobile device 160 is online. If so, the API 180 may invoke the middleware component 120 of the system 100 to retrieve the information. If the mobile device 160 is not online, the API 180 may attempt to retrieve the requested information from mobile device storage if the information is available.

An online topology indicates that that requested information may be retrieved from the network when the mobile device 160 is online. For a service that has an online topology, the API 180 may attempt to retrieve the requested information from the middleware component 120 of the system 100. In all three of these topologies, if the API 180 is unable to retrieve the information, the API 180 may report an error, which may in turn result in a call to the failure call-back function described earlier.

If the requested information is not stored within the mobile device 160, or if the service topology is online only or midline, then the API 180 may invoke the middleware component 120 of the system 100. In this regard, the API 180 may communicate the API process 305, one or more input parameters 312, and one or more expected return parameters 314 to the middleware component 120.

At block 210 of FIG. 2, the middleware component 120 may receive the API process 305, input parameters 312, and return parameters 314 from the API 180 of the mobile device 160.

Figure 6A:
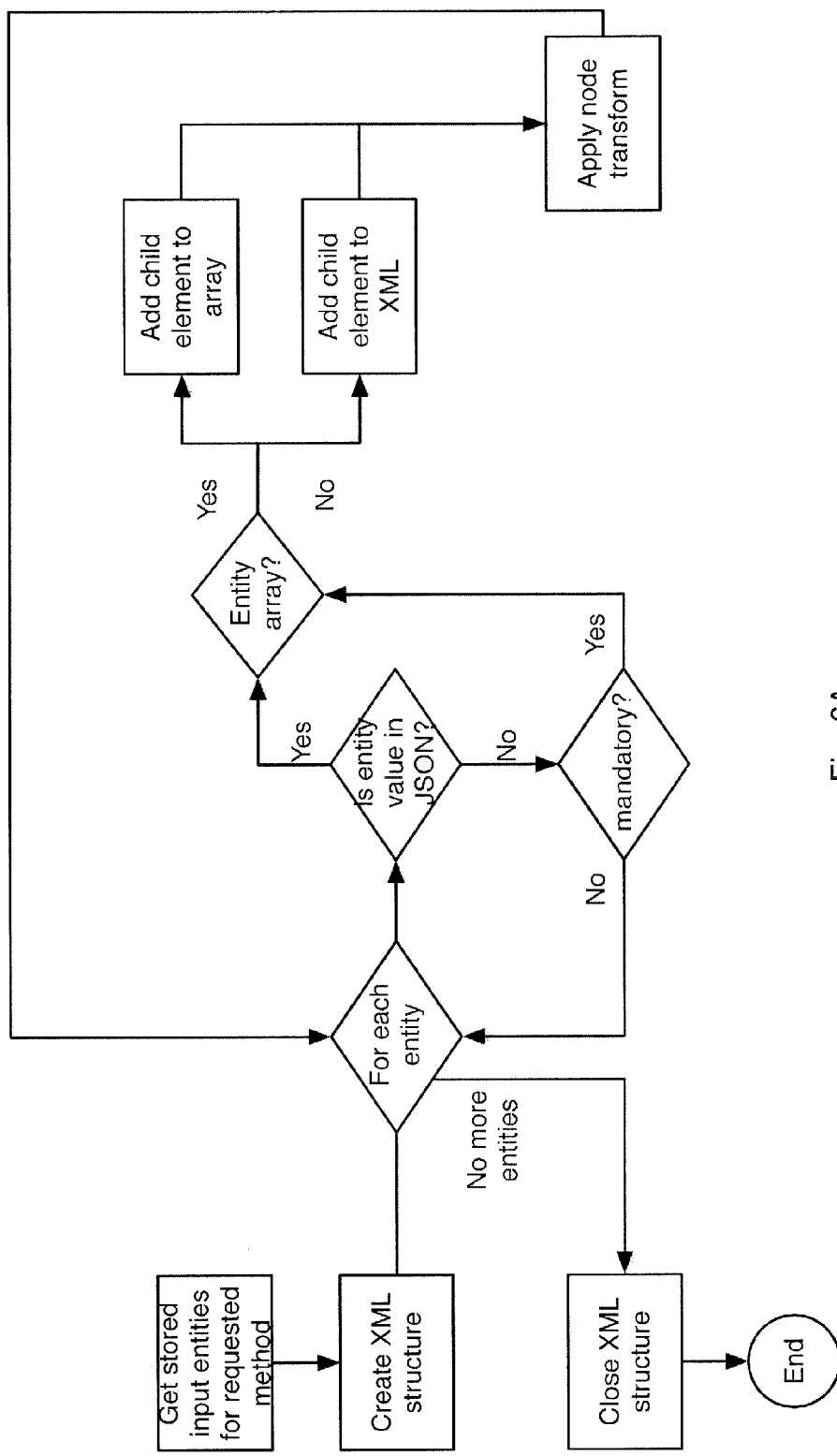

At block 215 of FIG. 2, the middleware component 120 may generate a SOAP structure or message for invoking a web service process associated with the API process 305. Referring to FIG. 6A, the middleware component 120 may initially determine the entities or parameters associated with the requested web service process. For example, as illustrated in the XML structure 620 of FIG. 6B, the SOAP message for invoking the web service process that is associated with the API process 305 may include name, social security number (SON), and date of birth (DOB) input parameters 625. Some of these parameters may be mandatory and others may be optional. The names of the input parameters 625 and the types (i.e., mandatory or not) may have been specified in API documentation and/or stored to a memory (not shown) in communication with the middleware component 120, and associated with a web service process. In this way, the middleware component 120 may dynamically determine the input parameters and their respective types by searching the memory for a record associated with the web service process.

Next, the middleware component 120 may generate an XML structure, such as the XML structure 620 of FIG. 6B that may be inserted into the body of a SOAP message in subsequent operations for requesting the information. The XML structure 620 may include placeholder or default values for all the input parameters 625 associated with the web service process that were determined at block 215.

The middleware component 120 then loops through the data values associated with the JSON input parameters 312 and copies the values to the corresponding locations within the XML structure 620, as illustrated in FIG. 6C. For example, the value "John Doe," which was specified in the JSON input parameters 312, may be used for the value for the "Name" parameter 625. Parameters 625 for which a value is not provided may be set to a default value. When arrays are included within the JSON input parameters 312, the middleware component 120 may generate individual XML elements that represent the elements of the array. After looping through the JSON input parameters 312 and copying the values to the XML structure 625, the middleware component 120 closes the XML structure 625.

Figure 7:
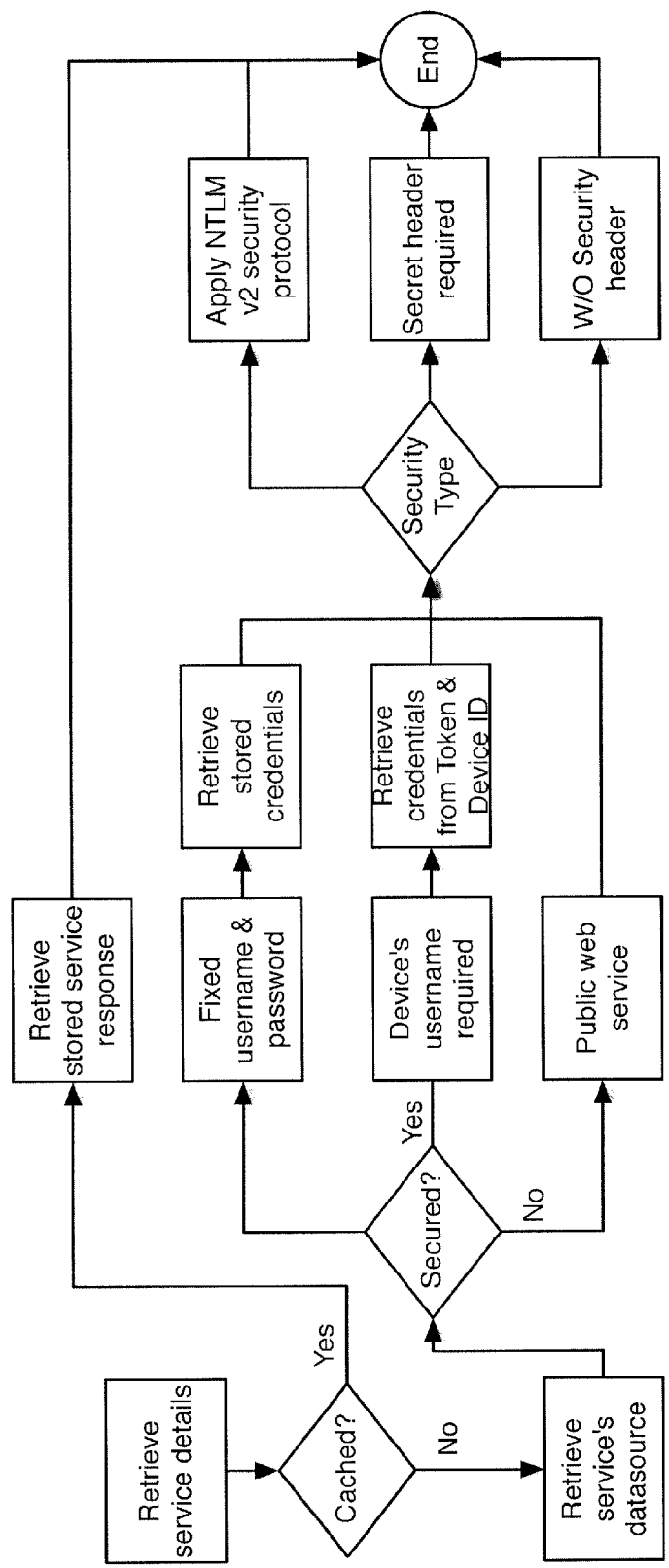

Returning to FIG. 2, at block 220, the middleware component 120 may determine service endpoint and data details associated with the web service process that is associated with the API process 305. For example, as illustrated in FIG. 7, the middleware component 120 may first determine whether the requested service stores or caches responses. If a stored response is available, the middleware component 120 may retrieve that response.

Otherwise, the middleware component 120 determines whether the requested web service process requires a security component. For example, a web service process may require that certain credentials be provided. The credentials may, for example, correspond to a combination of user name and password, a combination of a device name and a token associated with the device, or some other form of credential.

Next the middleware component 120 determines the type of security protocol to apply to the message. For example, an NTLM (Windows NT LAN Manager) challenge-response authentication protocol may be required to obtain an SSL (secure socket layer) certificate that is required by the web service process. A security header may be required in the SOAP message.

Figure 8:
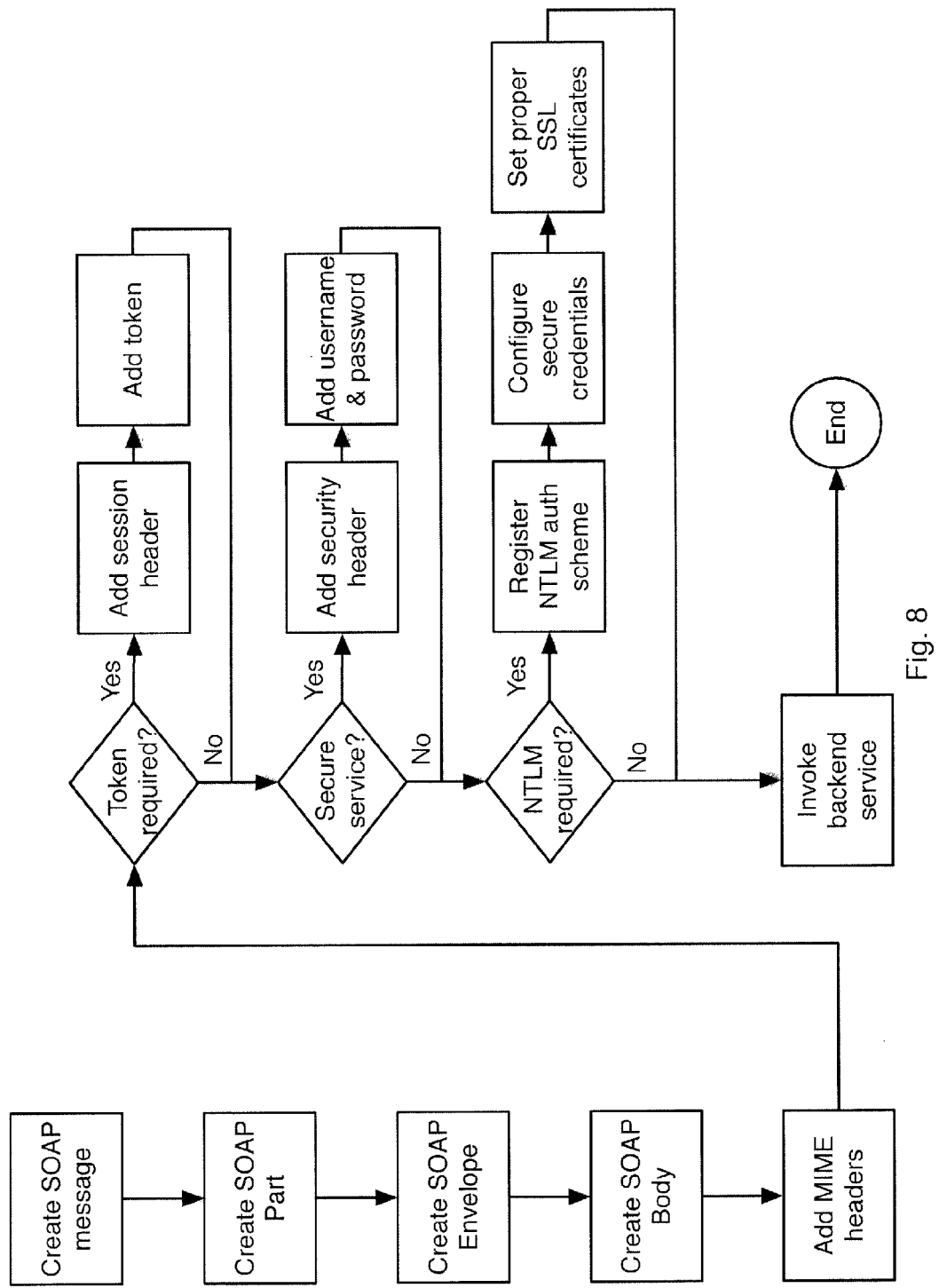

Returning to FIG. 2, at block 225, the web service process may be called. For example, as illustrated in FIG. 8, the SOAP message for invoking the web service process may be generated by wrapping the XML structure 620 generated at block 215 within a SOAP envelope. The XML structure 620 may correspond to the body portion of the SOAP message.

Next, MIME (multipurpose Internet mail extension) headers for specifying a session header with the token discussed above or a security header with the username and password discussed above may be attached to the SOAP message. If NTLM is required, the NTLM authentication scheme may be registered with the web services API and the security credentials may be configured, and secure socket layer (SSL) certificates may be set.

The completed SOAP message may be communicated to the web service API 115 to invoke the web service process associated with the SOAP message.

Figure 9A:
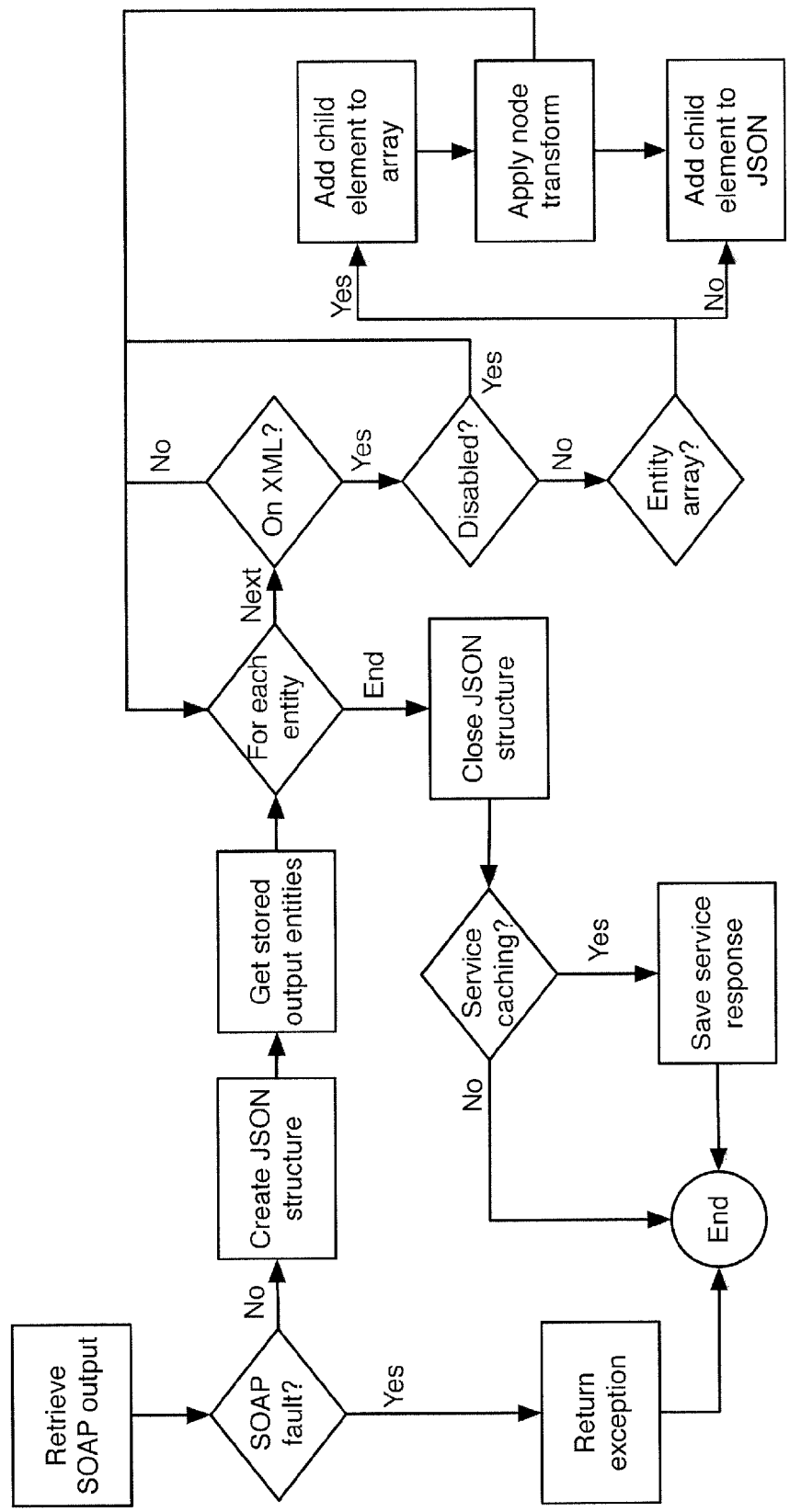
FIG. 9A illustrates exemplary operations performed by the middleware component of the system in receiving and converting a SOAP response message to JSON data.

Returning to FIG. 2, at block 230, a SOAP response message may be received from the web service API 115. For example, as illustrated in FIG. 9A, the middleware component 120 may receive a SOAP response message from the web service API 115. An exemplary portion of a SOAP response message 820 is illustrated in FIG. 9B. The middleware component 120 may initially determine whether the SOAP message 820 is a fault, in which case an error may be generated. If the SOAP message 820 is not a fault, then the data specified in the SOAP message 820 may be converted into a JSON formatted response 830 (FIG. 9C). In this regard, the middleware component 120 may select values from the SOAP message 820 associated with the return parameters 314 requested in the original API process 305 and may discard the other values returned in the SOAP message 820. After all the values associated with the requested return parameters 314 have been inserted into the JSON response 830, the middleware component 120 may communicate the JSON response to the mobile API 180.

Figure 10:
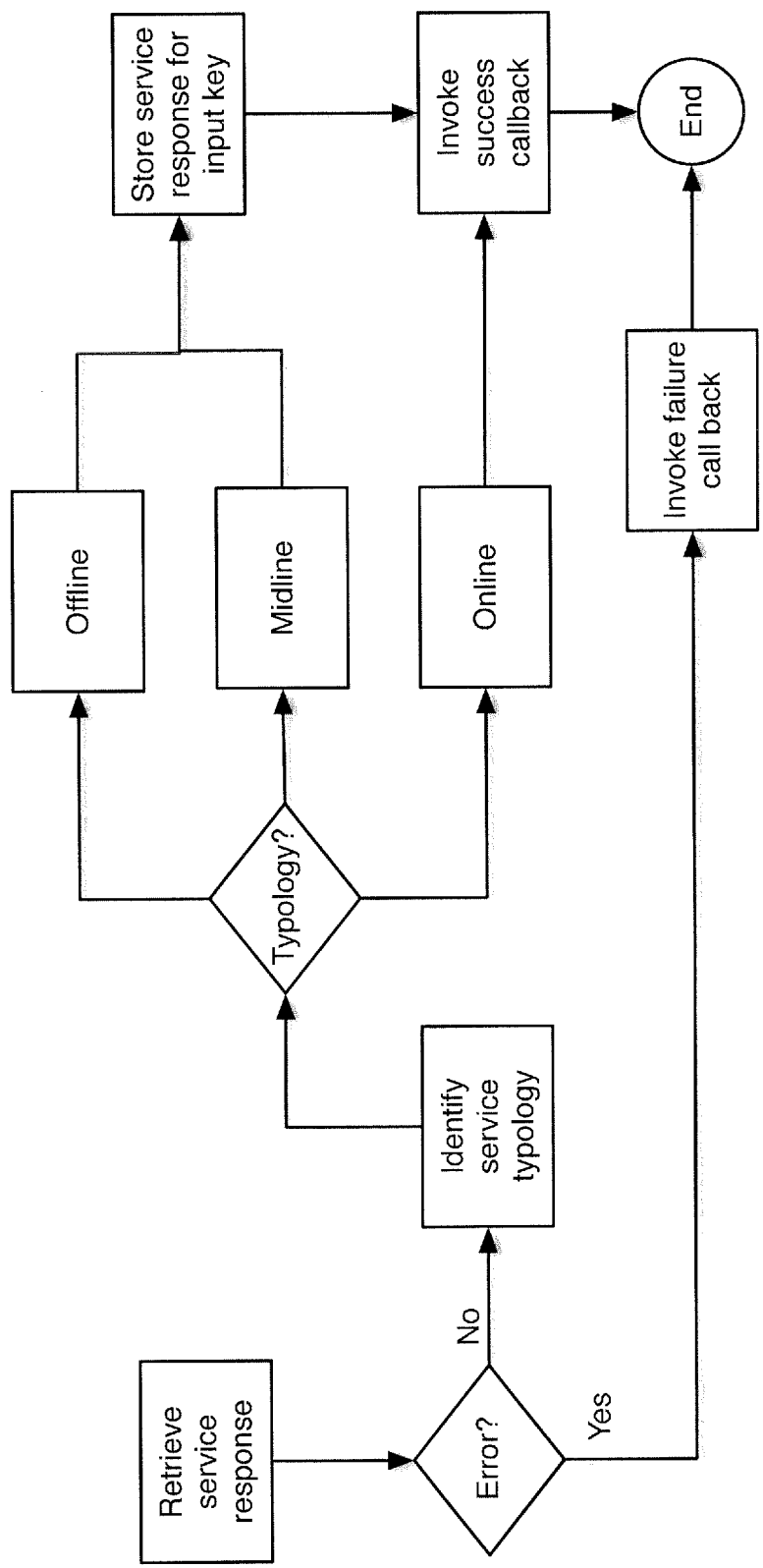
FIG. 10 illustrates exemplary operations performed by the API of the mobile device in receiving the JSON response.
Figure 11:
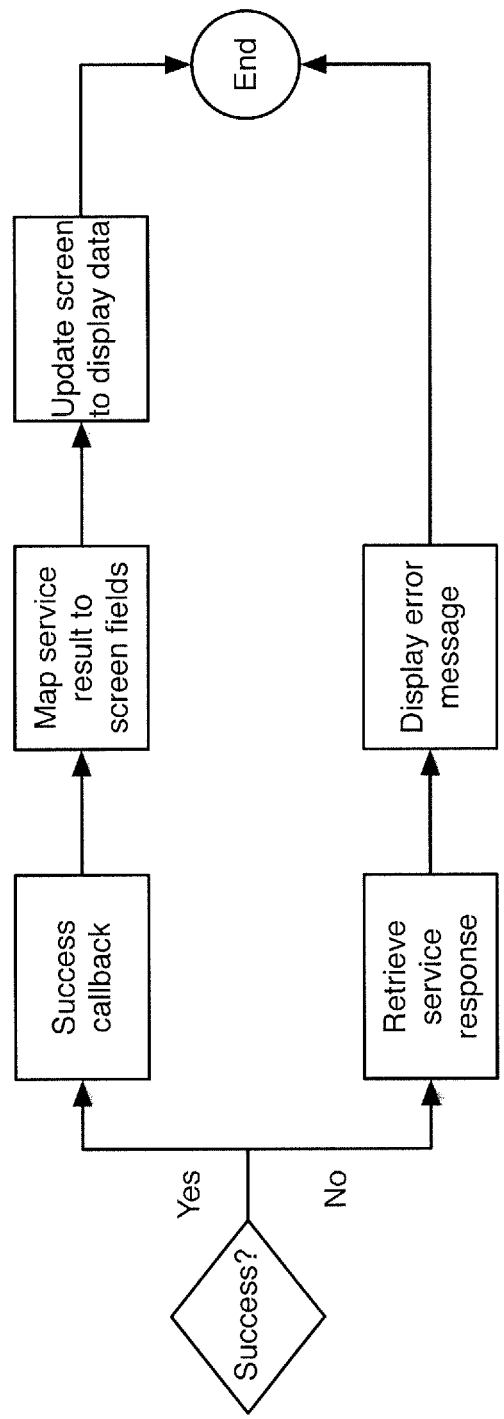
FIG. 11 illustrates exemplary operations performed by a mobile application in processing the data in the JSON response.

At block 232 of FIG. 2, the API 180 of the mobile device 160 receives and processes the JSON response 830. For example, as illustrated in FIG. 10, the API 180 may first determine whether the JSON response 830 indicates an error of some sort. If an error has occurred, the API 180 may invoke the registered call-back function. If no error has occurred, the API 180 determines the topology associated with the requested response 830, which may correspond to the topology of the initial request. If the response has an offline or midline topology, the JSON response 830 may be stored to the mobile device storage where it may be retrieved the next time the web service process is requested. Otherwise, if the topology is an online topology, the success call-back function may be invoked. The JSON response 830 received from the middleware component 120 may be communicated as an input parameter to the success call-back function.

At block 235 of FIG. 2, the application 175 may process the information communicated from the API 180. If the API 180 results an error, the application 175 may be configured to report the error by displaying a message on a screen of the mobile device 160. If the success call-back function is invoked, the JSON response 830 is processed by the application 175 and the application 175 may update various fields of the screen with the received information and/or utilize the information in different ways.

Figure 12:
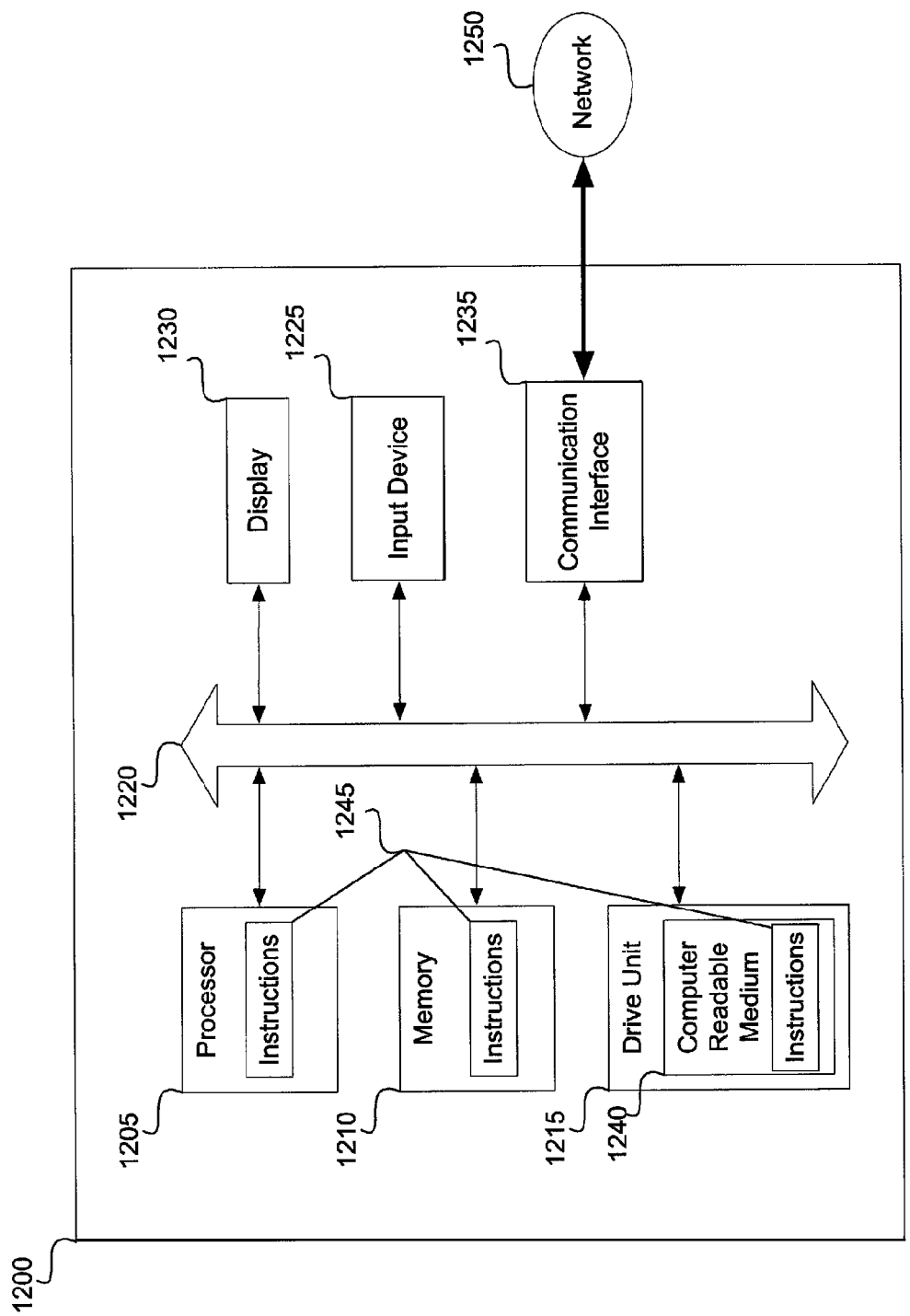
FIG. 12 illustrates a computer system that may correspond to any processing systems described below.

FIG. 12 illustrates a computer system 1200 that may form part of or implement the system 100, the mobile device 160, or any other module referenced herein. The computer system 1200 may include a set of instructions 1245 that the processor 1205 may execute to cause the computer system 1200 to perform any of the operations described above. The computer system 1200 may operate as a stand-alone device or may be connected, e.g., using a network, to other computer systems or peripheral devices.

In a networked deployment, the computer system 1200 may operate in the capacity of a server or as a client-user computer in a server-client user network environment, or as a peer computer system in a peer-to-peer (or distributed) network environment. The computer system 1200 may also be implemented as or incorporated into various devices, such as a personal computer or a mobile device, capable of executing the instructions 1245 (sequential or otherwise) that specify actions to be taken by that machine. Further, each of the systems described may include any collection of sub-systems that individually or jointly execute a set, or multiple sets, of instructions to perform one or more computer functions.

The computer system 1200 may include one or more memory devices 1210 on a bus 1220 for communicating information. In addition, code operable to cause the computer system to perform any of the operations described above may be stored in the memory 1210. The memory 1210 may be a random-access memory, read-only memory, programmable memory, hard disk drive or any other type of memory or storage device.

The computer system 1200 may include a display 1230, such as a liquid crystal display (LCD), a cathode ray tube (CRT), or any other display suitable for conveying information. The display 1230 may act as an interface for the user to see the functioning of the processor 1205, or specifically as an interface with the software stored in the memory 1210 or in the drive unit 1215.

Additionally, the computer system 1200 may include an input device 1225, such as a keyboard or mouse, configured to allow a user to interact with any of the components of system 1200.

The computer system 1200 may also include a disk or optical drive unit 1215. Any other forms of storage referenced herein may be stored on the disk drive unit 1215. The disk drive unit 1215 may include a computer-readable medium 1240 in which the instructions 1245 may be stored. The instructions 1245 may reside completely, or at least partially, within the memory 1210 and/or within the processor 1205 during execution by the computer system 1200. The memory 1210 and the processor 1205 also may include computer-readable media as discussed above.

The computer system 1200 may include a communication interface 1235 to support communications via a network 1250. The network 1250 may include wired networks, wireless networks, or combinations thereof. The communication interface 1235 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for communicating information between a mobile device and a computer system that provides a legacy application program interface (API) to facilitate access to services of the computer system, the method comprising:
   determining, by the mobile device, a topology associated with a request for information, the topology indicative of:
   a) whether the mobile device can retrieve the information from a cache of the mobile device, if the information is stored in the cache,
   b) whether the mobile device must attempt to retrieve the information from the computer system prior to attempting to retrieve the information from the cache, or
   c) whether the mobile device must retrieve the information from the computer system,
   if the information is not in the cache or must be retrieved from the computer system, communicating, by the mobile device, to the computer system, a request to invoke a process of the legacy API, wherein the request specifies one or more input values associated with at least some required input parameters of the process, wherein the one or more input values are provided in a first format that is different from a second format utilized by the legacy API for communicating data;
   determining, by the computer system, required input parameters of the process of the legacy API;
   generating, by the computer system, an input data structure in the second format that includes an entry for each of the required input parameters;
   determining, by the computer system, one or more parameters of the required input parameters that are associated with the one or more input values communicated in the request;
   setting values of entries in the input data structure associated with the one or more determined parameters to corresponding one or more input values in the request; and
   generating a message to call the process of the legacy API, wherein the message is formatted in the second format and includes the input data structure.

2. The method according to claim 1, wherein the request specifies the required input parameters associated with the one or more input values, and specifies one or more return parameters for which values are to be returned from the computer system.

3. The method according to claim 2, further comprising:
   receiving, at the computer system, a response associated with the process of the legacy API that includes a response data structure formatted in the second format;
   determining, by the computer system, data in the response data structure associated with the one or more return parameters;
   generating response data that includes the determined data in the first format; and
   communicating a response to the mobile device, wherein the response includes the response data.

4. The method according to claim 1, wherein the legacy API corresponds to a web service API and the second format corresponds to simple object access protocol (SOAP).

5. The method according to claim 1, wherein the first format corresponds to javascript object notation (JSON).

6. The method according to claim 1, further comprising determining whether a service requested by the mobile device is secured, wherein when secured, the computer system is configured to retrieve one of stored credentials associated with a user of the mobile device and a combination of a token and device identifier to authenticate the mobile device.

7. The method according to claim 6, wherein the computer system is further configured to insert security information in the generated message when the requested service is secured.

8. A non-transitory computer-readable medium comprising instruction code for facilitating communication of information between a mobile device and a computer system that provides a legacy application program interface (API) to facilitate access to services of the computer system, the instruction code is executable by the computer system for causing the computer system to perform acts of:
receiving a request from the mobile device to invoke a process of the legacy API, wherein the request specifies one or more input values associated with at least some required input parameters of the process, wherein the one or more input values are provided in a first format that is different from a second format utilized by the legacy API for communicating data, wherein the request for information is associated with a topology indicative of:
a) whether the mobile device can retrieve the information from a cache of the mobile device, if the information is stored in the cache,
b) whether the mobile device must attempt to retrieve the information from the computer system prior to attempting to retrieve the information from the cache, or
c) whether the mobile device must retrieve the information from the computer system;
determining required input parameters of the process of the legacy API;
generating an input data structure in the second format that includes an entry for each of the required input parameters;
determining one or more parameters of the required input parameters that are associated with the one or more input values communicated in the request;
setting values of entries in the input data structure associated with the one or more parameters to corresponding one or more input values in the request; and
generating a message to call the process of the legacy API, wherein the message is formatted in the second format and includes the input data structure.

9. The non-transitory computer-readable medium according to claim 8, wherein the request specifies the required input parameters associated with the one or more input values, and specifies one or more return parameters for which values are to be returned from the computer system.

10. The non-transitory computer-readable medium according to claim 9, wherein the instruction code is further executable by the computer system for causing the computer system to perform acts of:
receiving a response associated with the process of the legacy API that includes a response data structure formatted in the second format;
determining data in the response data structure associated with the one or more return parameters for which values are to be returned from the computer system;
generating response data that includes the determined data in the first format; and
communicating a response to the mobile device, wherein the response includes the response data.

11. The non-transitory computer-readable medium according to claim 8, wherein the legacy API corresponds to a web service API and the second format corresponds to simple object access protocol (SOAP).

12. The non-transitory computer-readable medium according to claim 8, wherein the first format corresponds to javascript object notation (JSON).

13. The non-transitory computer-readable medium according to claim 8, wherein the instruction code is further executable by the computer system for causing the computer system to perform acts of:
determining whether a service requested by the mobile device is secured, wherein when secured, the computer system is configured to retrieve one of stored credentials associated with a user of the mobile device and a combination of a token and device identifier to authenticate the mobile device.

14. The non-transitory computer-readable medium according to claim 13, wherein the computer system is further configured to insert security information in the generated message when the requested service is secured.

15. A system that facilitates communications with a mobile device, wherein the system provides a legacy application program interface (API) to facilitate access to services of the system, the system comprising:
a processor; and
a computer-readable medium in communication with the processor, wherein the computer-readable medium includes instruction code for facilitating the communication of information between the mobile device and the computer system, and the instruction code is executable by the processor for causing the processor to perform acts of:
receiving a request from the mobile device to invoke a process of the legacy API, wherein the request specifies one or more input values associated with at least some required input parameters of the process, wherein the one or more input values are provided in a first format that is different from a second format utilized by the legacy API for communicating data, wherein the request for information is associated with a topology indicative of:
a) whether the mobile device can retrieve the information from a cache of the mobile device, if the information is stored in the cache,
b) whether the mobile device must attempt to retrieve the information from the computer system prior to attempting to retrieve the information from the cache, or
c) whether the mobile device must retrieve the information from the computer system;
determining required input parameters of the process of the legacy API;
generating an input data structure in the second format that includes an entry for each of the required input parameters;
determining one or more parameters of the required input parameters that are associated with the one or more input values communicated in the request;

setting values of entries in the input data structure associated with the one or more parameters to corresponding one or more input values in the request; and
generating a message to call the process of the legacy API, wherein the message is formatted in the second format and includes the input data structure.

16. The system according to claim 15, wherein the request specifies the required input parameters associated with the one or more input values, and specifies one or more return parameters for which values are to be returned from the computer system.

17. The system according to claim 16, wherein the instruction code is further executable by the processor for causing the processor to perform acts of:
receiving a response associated with the process of the legacy API that includes a response data structure formatted in the second format;
determining data in the response data structure associated with the one or more return parameters;
generating response data that includes the determined data in the first format; and
communicating a response to the mobile device, wherein the response includes the response data.

18. The system according to claim 15, wherein the legacy API corresponds to a web service API and the second format corresponds to simple object access protocol (SOAP), and wherein the first format corresponds to javascript object notation (JSON).

19. A mobile device for communicating information to a computer system, the mobile device comprising:
a processor; and
a computer-readable medium in communication with the processor, wherein the computer-readable medium includes instruction code for facilitating the communication of information between the mobile device and a computer system that provides a legacy application program interface (API) to access services of the computer system, the instruction code is executable by the processor for causing the processor to perform acts of:
receiving from an application of the mobile device a request to invoke a process of the legacy API, wherein the request specifies one or more input values associated with at least some required input parameters of the process, wherein the one or more input values are provided in a first format that is different from a second format utilized by the legacy API for communicating data, and wherein the process provided by the legacy API is configured to return a response data structure;
determining whether response data associated with the response data structure is stored on the mobile device;
if the response data is stored on the mobile device, returning the stored response data to the application; and
when the response data is not stored on the mobile device, communicating the request to the system according to claim 15 to retrieve the response data.

20. The mobile device according to claim 19, wherein when the response data is not stored on the mobile device, the instruction code is executable by the processor for causing the processor to store the response data on the mobile device.

* * * * *